United States Patent [19]

Kronogard

[11] 4,337,623
[45] Jul. 6, 1982

[54] VEHICLE DRIVE SYSTEM

[76] Inventor: Sven-Olof Kronogård, Karstorpsvägen 31, Lomma, Sweden, S 23400

[21] Appl. No.: 149,760

[22] Filed: May 14, 1980

Related U.S. Application Data

[60] Division of Ser. No. 148,217, May 9, 1980, which is a continuation of Ser. No. 844,079, Oct. 20, 1977, abandoned.

[30] Foreign Application Priority Data

Oct. 20, 1976 [SE] Sweden ................................ 7611617

[51] Int. Cl.³ ............................................ F01B 21/02
[52] U.S. Cl. ............................ 60/716; 123/DIG. 8; 74/606 R; 74/665 B
[58] Field of Search ................. 74/606 R, 665 B; 123/DIG. 7, DIG. 8; 60/716, 718

[56] References Cited

U.S. PATENT DOCUMENTS

| | | | |
|---|---|---|---|
| 1,034,242 | 7/1912 | Johnson | 123/DIG. 8 |
| 1,900,470 | 3/1933 | Smith | 123/DIG. 8 |
| 2,832,201 | 4/1958 | Alexander | 60/716 |

*Primary Examiner*—Allen M. Ostrager
*Attorney, Agent, or Firm*—Holman & Stern

[57] ABSTRACT

A vehicle drive system comprises at least two prime movers communicating by way of a base block with a common output shaft. The base block has a housing enclosing two parallel, cylindrical chambers, and is provided with external mounting members for mounting in the vehicle. A strengthening wall structure separating the two chambers is defined by part-cylindrical surfaces bordering the chambers. The prime movers are mounted directly at the base block, with their shafts aligned with the axes of the chambers, and a gearing within the housing has transmission elements extending through openings in the strengthening wall.

6 Claims, 13 Drawing Figures

VEHICLE DRIVE SYSTEM

This application is a division of Ser. No. 148,217 filed May 9, 1980, which is a continuation of application No. 844,079, filed on the 20th of Oct., 1977, now abandoned and claiming priority from my Swedish application No. 76-11617-7, filed on the 20th of Oct., 1976.

BACKGROUND OF THE INVENTION

The present invention relates to vehicle drive systems in a broad sense, i.e. machineries suited to all types of wheeled vehicles, but also to pleasure boats and various types of commerical vessels and is related to the following copending applications filed simultaneously herewith: Ser. No. 149,759, entitled "A Vehicle Drive Plant;" and Ser. No. 149,761, entitled "A Vehicle Transmission".

A car factory with mixed production must have a number of engine types and sizes in production simultaneously in order to meet current needs within the passenger car, truck, bus and industrial vehicle sectors. Passenger car engine series are in most cases significantly longer than the series for truck engines, and there are thus more possibilities for making the production more efficient. The costs per horsepower are therefore much lower for passenger car engines than for truck engines, for example. The latter are in general more powerful per unit than the former, often by a factor of two to four. It is quite obvious that design, production, stocks of spare parts and service in general increase appreciably with the number of engine types, or sizes, available at the same time. It is not uncommon for a medium sized car manufacturer to have a score of basic types.

Great simplification and a significant reduction of production and spare parts costs would be achieved, if a small number, preferably only two or three, of basic engine sizes could be used instead of a number of passenger car engines and a large number of industrial vehicle and truck engines, and such basic engines could be simply and efficiently combined to produce a large number of different engine packages, with varying horsepowers, essentially covering the entire horsepower range of interest.

If an internal combustion engine is selected, which covers the lowest output required, e.g. 75 HP, it can be manufactured in a standard model A, and a supercharged model B, which produces, say for the sake of simplicity, 100 HP. The standard and the supercharged version of the basic engine will be identical with respect to about 90% of their components.

The use of these engines in a conventional manner provides two models of 75 HP and 100 HP, respectively, based upon a single basic engine.

Combining according to the invention 2 A-engines produces 150 HP, combining A+B produces 175 HP, and the combination 2B produces 200 HP. Combining 3 A-engines produces 225 HP, and so on up to 400 HP (4 B-engines) in steps of 25 HP. By using basic engines of 100 and 150 HP, respectively, the horsepower range from 100 to 600 HP can be covered in steps of 50 HP.

For combining two or more engines it will be necessary to use some kind of base block containing the gearing transferring the outputs of the engines to the common output shaft.

One aim of the present invention is to propose a base block of strong and simple design, which facilitates mounting in the vehicle as well as servicing and maintenance.

SUMMARY OF THE INVENTION

A vehicle drive system according to the invention comprises at least two prime movers and a base block, attachible to the vehicle, and containing transmission for connection with a common output shaft.

The base block has a housing enclosing two parallel, cylindrical chambers, and is provided with external mounting members for mounting the block in a vehicle. A strengthening wall structure separating the two chambers is defined by part-cylindrical surfaces bordering said chambers.

Means are provided for mounting said prime movers directly at the base block, with their shafts aligned with the axes of said chambers, and a gearing means is enclosed in the base block, connected to said prime movers and said common output shaft.

Suitable prime movers are, as was indicated above, internal combustion engines, e.g. diesel engines, which have several advantages in view of the strict requirements regarding exhaust emissions and fuel economy. A V-engine has a more compact and stable construction than a straight engine (I-engine), and is therefore preferable. The invention is also quite suitable for use with gas turbines, and the combination of piston engines and gas turbines is quite conceivable in certain cases, with or without partial heat exchange. The piston engine may, for instance, be used in city traffic, or, in trucks, with partial load or no load, while the gas turbine may be used, alone or together with the piston engine, on highways, or when the vehicle is carrying a heavy load. Within the near future it may be interesting to successively go over to pure gas turbine operation in more and more applications. The system offers completely new possibilities even for a medium-sized car manufacturer to introduce a new type of engine, e.g. a passenger car diesel or a passenger car gas turbine, with a minimum of risk and costs and maximum use (passenger cars, trucks, busses).

Even for gas turbines it can be suitable to have a standard version, and a higher charged model, for example operating with a higher pressure. A small number of basic engines will largely increase the efficiency of production, and reduce the stock of spare parts. Service and maintenance will be facilitated due to the fact, that it is possible to quickly replace an entire engine unit, which is beginning to wear out, or otherwise fails to function properly.

Especially with respect to trucks and industrial vehicles, a delay in the repair shop involves a great economic loss. If one could order a replacement engine, and have it quickly installed, the delay would be reduced to a minimum compared with that for dismounting and repairing the (only) engine, to replace e.g. a bearing or a piston.

Even for military applications, the present system offers great advantages, using for example only one basic engine, with the same spare parts for all motorized equipment.

To be able to simply, compactly and economically combine a plurality of prime movers, the invention requires a base block constructed in a specific manner as specified below, so as to obtain a compact and light package. We are dealing here with comparatively simple and rugged, but light and compact, mechanical components, where the effect of changes of combinations are much more easily judged, than changes in the power output or size from a prime mover, whether it be a piston engine or a gas turbine.

DESCRIPTION OF SOME PREFERRED EMBODIMENTS

Figure 1:
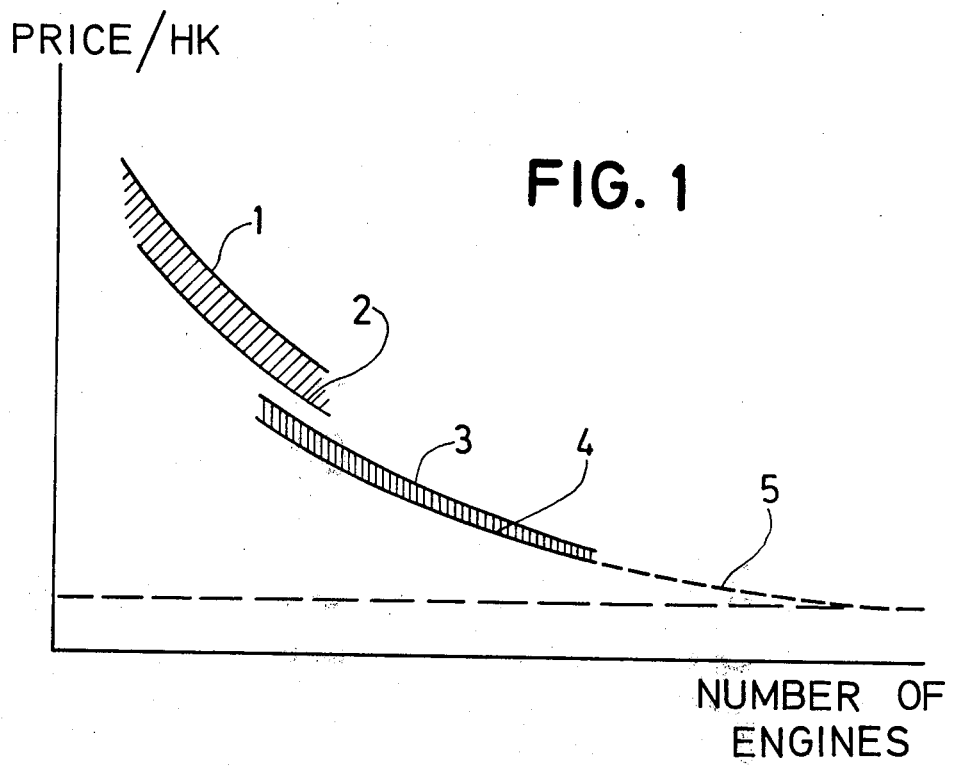
FIG. 1 is a graph showing the cost of manufacture, given as cost per horsepower as a function of the number of engines manufactured in the same series.

FIG. 1 is a graph showing the relationship between cost per horsepower and the number of identical engines in the same series. Curves 1 and 2 show the relationship for two series of engines intended for trucks and heavier vehicles. Curves 3 and 4 show corresponding relationships for two types of passenger car engines.

Since the production of passenger cars is many times greater (often ten times or more) than the production of heavier vehicles, the series of passenger car engines are substantially longer than other engine series. Furthermore, the heavier engines are generally more advanced and are therefore more expensive per engine.

It is an obvious advantage to be able to use for instance two passenger car engines instead of one heavier engine. It is not only that a less expensive engine can be used, the series it belongs to will be further increased, additionally reducing the cost per horsepower, since there will be more units in the series to spread the overheads about. This is illustrated by the broken line 5, which is an extension of curve 4.

Figure 2:
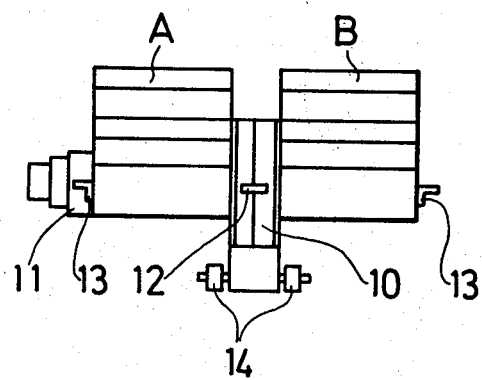
FIGS. 2 and 3 show a side view and an end view, respectively, and a vehicle drive plant comprising two V-engines arranged end-to-end.
Figure 3:
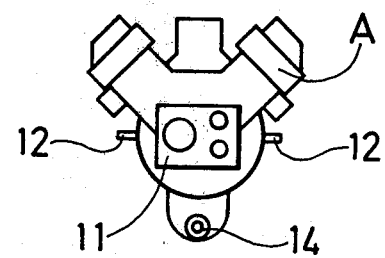

A certain modification and a reduction in power is necessary for the transition from lighter to heavier operating conditions, depending upon the engines and the installation. FIGS. 2 and 3 show a first plant containing two engines, mounted side-by-side, and interconnected through a base block 10. The engines are identical, and the one to the left in FIG. 2, designated A, is a standard model, while the one to the right is supercharged, and is designated B.

Supercharging can increase the effective power by up to 50%, but 90 to 95% of the parts in the engines are the same. The passenger car diesel is especially suited in this respect.

As was mentioned in the introduction, the availability of a supercharged and a non-supercharged model of the same basic engine provide good possibilities of obtaining the desired total power by combining two or more units of Type A, or Type B.

In FIGS. 2 and 3 two identical V-engines A and B are mounted end-to-end, with a supporting base block 10 between themselves. An electric generator, an oil pan and a filter are mounted as one unit 11 at the end of one of the engines.

In this case the engines are rigidly connected axially, directly to the base block, which is provided with external mounting members 12. At the outward end of at least one of the engines there is a further supporting member 13. The common output shaft is labelled 14, and it is assumed that power can be extracted in both directions.

Figure 4:
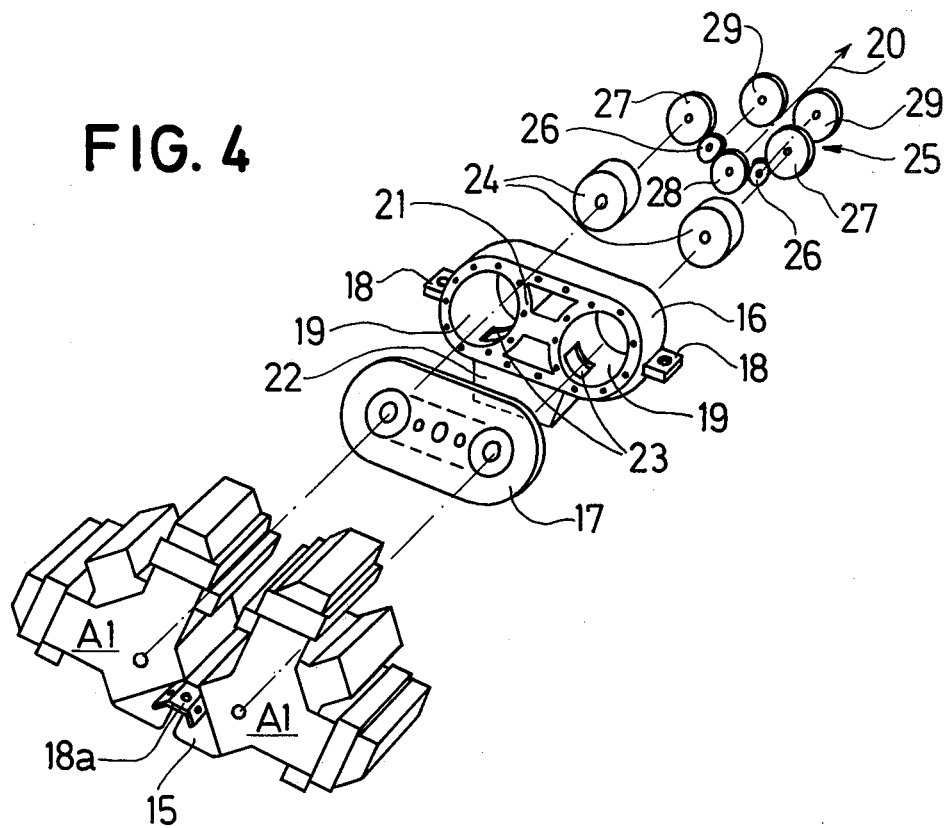
FIG. 4 is an exploded view of a plant including two V-engines arranged side-by-side.

FIG. 4 shows an exploded view of a plant comprising two V-engines, A 1, each provided with an oil sump 15. The engines A 1 are attached axially to a base block 16, which contains the transmission. The block is closed be means of covers 17 (only one is shown), and is provided with mounting members 18. A third mounting member 18a is provided at the end of the engines remote from the base block, and supports both engines.

Base block 16 encloses two parallel, cylindrical chambers 19, within which main components of a gear transmission combining the output shafts of the engines with the vehicle propulsion shaft are to be mounted. The arrangement permits individual mounting of the engines with their shafts parallel with the propulsion shaft 20.

The walls separating the chambers from a strengthening structure 21, which in a cross section looks mainly as an X and noticeably increase the rigidity of the block. The walls will thus be defined by part-cylindrical faces bordering the chambers. Below the two chambers there is a block compartment (drop-box) 22, which encloses the transmission members adjacent to the propulsion shaft.

Transmission components within the chambers 19 and the drop-box 22 communicate by way of openings 23 in the walls separating the various compartments.

By locating the mounting members 18 level with the center axes of the chambers a long, torque lever is obtained, which is well suited to take care of the reaction torque from the gearing. A basically similar arrangement can be used for three or four engines connected to the same base block, the mounting members 18 carrying a main portion of the total weight of the engine plant.

Hydrostatic torque converters 24 and the necessary clutches can be arranged within the base block. The connecting gear train, generally designated 25, between the two crankshafts and the output shaft 20 includes intermediate gears 26, having a smaller diameter than the gears 27 and 28, which are mounted upon the engine crankshafts and the output shaft, respectively. The intermediate gears will thus rotate at a relatively high r.p.m. Flywheels 29, oscillation dampers, or other freely rotatable masses are connected to these intermediate gears. Since they rotate at high r.p.m., their dimensions can be reduced in relation to that required for flywheels mounted directly at the crankshafts. The size of the engine's standard flywheels can thus be reduced, or they may be deleted, depending upon the type of engine and the way of connecting the same.

Even if it is not shown in the figures, it is obvious that the output shaft 20 in the usual manner passes through a gear box of manual or automatic type, provided with reverse step.

As was stated previously, the proposed system provides great possibilities for combining engines, not only of different sizes, but also of different basic types such as diesel, Otto, gas turbine and electric.

Figure 5:
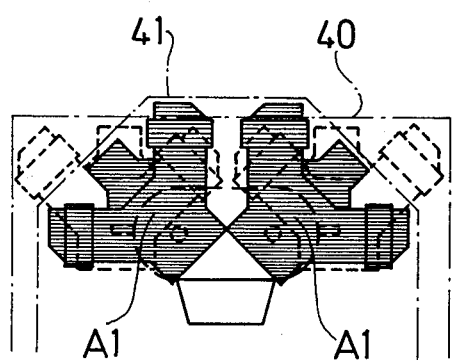
FIG. 5 is an end view of the plant according to FIG. 4, and showing the space compared with engines mounted in the conventional manner.

FIG. 5 illustrates the saving in space obtained by mounting two V-engines A 1 at a base block 16. Two engines mounted in conventional manner are shown in broken lines, while two engines mounted according to the invention are shaded with horizontal lines. The conventionally mounted engines require a space which is bounded by the rectangular frame 40, while the V-mounting occupies a smaller space, bounded by frame 41. It is true that this space is somewhat higher than the former, but it is narrower and, most important, there are no protruding upper corners, an advantage in many engine spaces.

Figure 6:
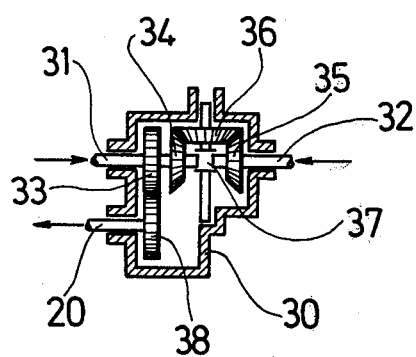
FIG. 6 shows, quite schematically, a gearing arrangement with drop-box at two axially connected engines.

FIG. 6 schematically shows the gearing arrangement in a base block of X-type with a drop-box. The block housing is denoted by 30. Two engines are connected to the block, end-to-end, their input shafts being designated 31 and 32. The output shaft is labelled 20, as in FIG. 4. Shaft 31 is provided with a spur gear 33 and a bevel gear 34. Shaft 32 is provided with a bevel gear 35. The two bevel gears cooperate via one or more intermediate bevel gears 36. The input shafts 31 and 32 are journalled at 37, between their respective bevel gears 34 and 35. A spur gear 38 on the output shaft 20 cooperates with spur gear 33, and will thus transmit the power from both engines.

Figure 7:
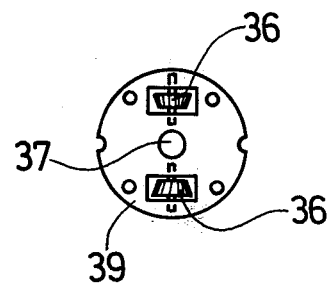
FIG. 7 shows a simple mounting arrangement for the reversing gears in a gear box according to FIG. 6.

FIG. 7 shows an alternative arrangement for the mounting of the intermediate bevel gears 36. They are fitted into the openings in a plate 39, which is sufficiently thick to permit the trunnions of the gears being journalled therein. The plate is fitted between two halves of the housing 30, and is bolted together with them. Bearing 37 for the input shafts is disposed centrally in the plate. There should of course be clutches and/or free-wheels, making it possible to engage or disengage either engine.

Figure 8:
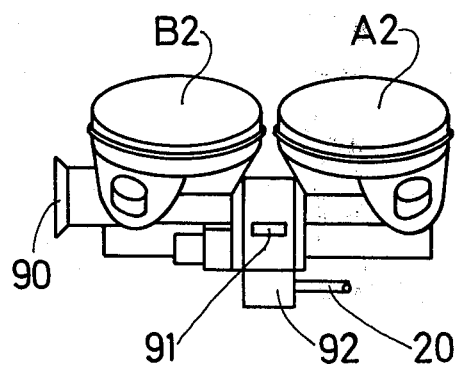
FIG. 8 shows a side view of an engine plant comprising four gas turbines.
Figure 9:
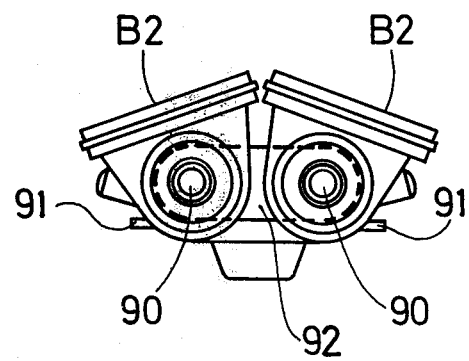
FIG. 9 shows an end view of the plant according to FIG. 8.

FIGS. 8 and 9 show an arrangement comprising two gas turbines of basic type A 2 and two supercharged models B 2. The supercharger in the left hand gear turbines in FIG. 8 is labelled 90.

The gas turbines are axially connected to an intermediate base block, which is provided with mounting members 91. This block is of the same basic type as was described in connection with FIG. 4.

Figure 10:
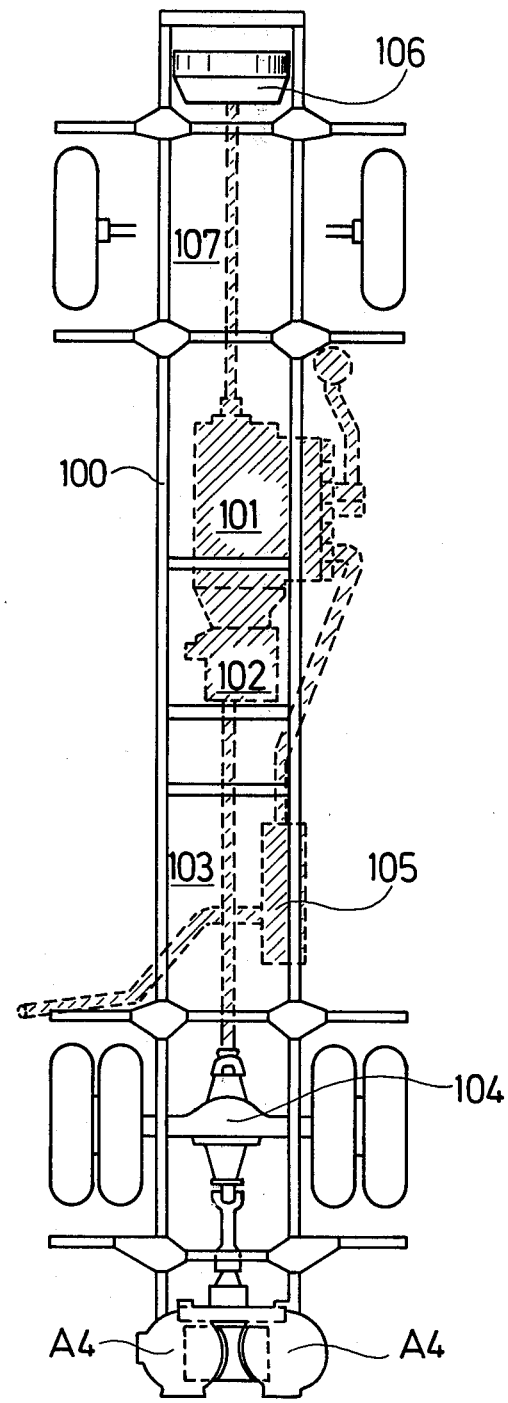
FIG. 10 is a plane view of a bus chassis with a conventional engine, indicated by broken lines, with an engine plant comprising two gas turbines according to the invention, drawn in full lines.

FIG. 10 schematically shows, in plane view, a chassis 100 for a bus. The conventional piston engine and the pertaining components are indicated with broken lines. The engine 101 is mounted with the cylinders horizontal, and drives the rear wheels in the conventional manner via a gear box 102, a propulsion shaft 103 and a differential 104. The exhaust system with muffler is labelled 105. The fan 106 at the radiator in the front of the bus is driven via a shaft 107 from the engine 101. It is apparent that it is a very complicated and space-requiring arrangement. The figure also show, with full lines, an engine arrangement according to the invention with two gas turbines A 4, having the same power as the conventional piston engine 101.

This engine arrangement can be built-in close to the rear axle differential 104, simplifying the entire installation, while providing more space for baggage and/or passengers. The weight saving is approximately 2 kg/HP, i.e. about 500 kgs for a 250 HP engine package, including auxiliary apparatus, cooling system, transmission and mountings.

Figure 11:
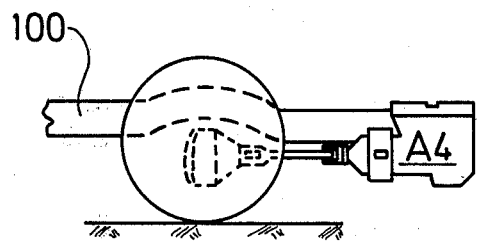
FIG. 11 is a side view of the end portion of the chassis according to FIG. 10.

FIG. 11 shows a side view of the rear portion of the chassis according to FIG. 10, indicating that the vertical space requirements are not great.

Figure 12:
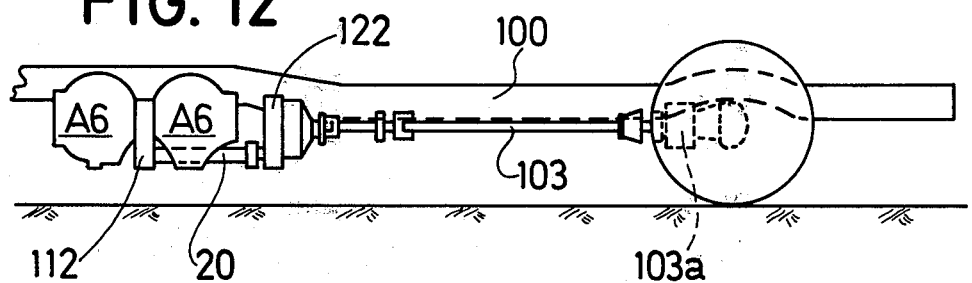
FIG. 12 shows an alternative engine mounting in a vehicle chassis for an engine arrangement according to the invention.

FIG. 12 shows an alternative arrangement, in which it is desired that the engines be placed between the wheels of the vehicle. In gas turbines, higher r.p.m:s for the propulsion shaft can advantageously be used (8,000–12,000 r.p.m tested in practice), which drastically reduces the dimensions of the transmission 121, propulsion shaft 103, and differential 103a.

The chassis is labelled 100, as in the preceeding arrangement, and the propulsion shaft is labelled 103.

Figure 13:
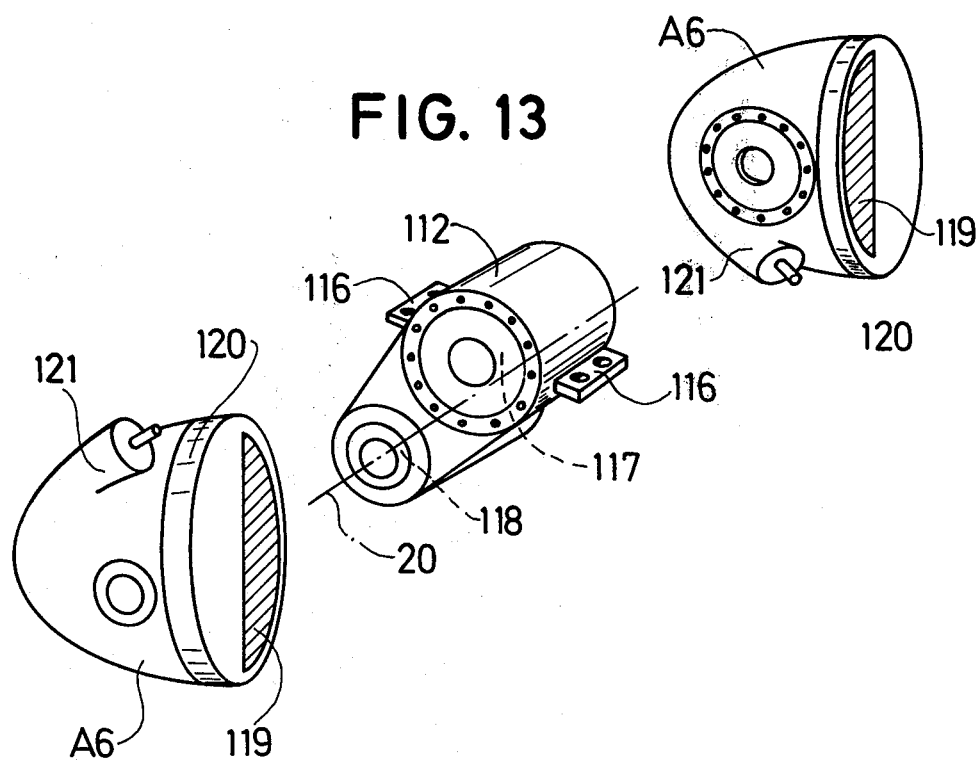
FIG. 13 shows an exploded view of the engine arrangement in FIG. 12.

FIG. 13 shows an exploded view of the engine arrangement in FIG. 12. The engine arrangement comprises two gas turbines A 6, which in this case have their output shaft connections disposed horizontally. They are axially connected to an X-block 112, lying between them and provided with mounting members 116.

Also here the base block will enclose two cylindrical chambers 117, 118, but only one of them, 117, is used for interconnection of prime movers. The other chamber, 118, corresponds to the drop-box of the previous arrangements. The last mentioned chamber will be located below the first chamber, but is displaced sidewards with respect to a vertical plane containing the center axis of the first chamber.

The two gas turbines are indentical, but are turned 180°, and mounted in mirror image position. In the gas turbine in the foregound of FIG. 13 the combustion chamber 118 is thus located at the top, and the gas exhaust 119 from the air preheater 120 is located closest to the X-block. In the other gas turbine, the combustion chamber 118 is located at the lower side, while the gas exhaust 119 has the same position near the base block.

The output shaft 20 extends from the block, past the rear gas turbine, and is connected to a gear box/torque converter 121, from which the propulsion shaft 103 extends.

The embodiments above described and illustrated in the drawings are examples only, which do not limit the scope of the invention as defined in the appended claims.

What I claim is:

1. A vehicle drive system comprising at least two prime movers and a base block communicating said prime movers with an output shaft, said base block having a housing enclosing two parallel, cylindrical chambers, and provided with external mounting members for mounting the block in a vehicle, a strengthening wall structure separating said chambers and being defined by part-cylindrical surfaces bordering said chambers, means for mounting said prime movers directly at said base block, with their shafts aligned with the axes of said chambers, and gearing means enclosed in said base block, connected to said prime movers and said common output shaft.

2. The vehicle drive system according to claim 1, in which said mounting members are fitted substantially level with the central axes of the chambers.

3. The vehicle drive system according to claim 1, in which said two cylindrical chambers are arranged in the same horizontal plane, a portion of the base block's housing enclosing the output shaft being located below said chambers and intermediate the same, transmission members between the shafts of said prime movers, and said output shaft communicating by way of openings in said strengthening wall structure.

4. The vehicle drive system according to claim 3, in which the portion of said gearing means contained in each cylindrical chamber includes a small-diameter, intermediate gear wheel, meshing with bigger-diameter gear wheels at the shaft of the associated prime mover and at the output shaft, respectively, free rotatable members being drivingly connected to said intermediate gear wheels.

5. The vehicle drive system according to claim 3, in which two prime movers are fitted side-by-side to the same end of said base block, and a further mounting member is provided at the ends of said prime movers remote from the base block and interconnecting said remote ends.

6. The vehicle drive system according to claim 1, in which said base block is adapted to receive one prime mover to each end of one of its chambers only, and said mounting members are fitted substantially level with the center axis of said one chamber, the other chamber, where the output shaft is connected, being arranged below said one chamber and displaced to one side of a vertical plane containing the center axis thereof.

* * * * *